Oct. 19, 1954 W. F. ALLER 2,691,827
ADJUSTABLE ORIFICE UNIT
Filed Aug. 17, 1950
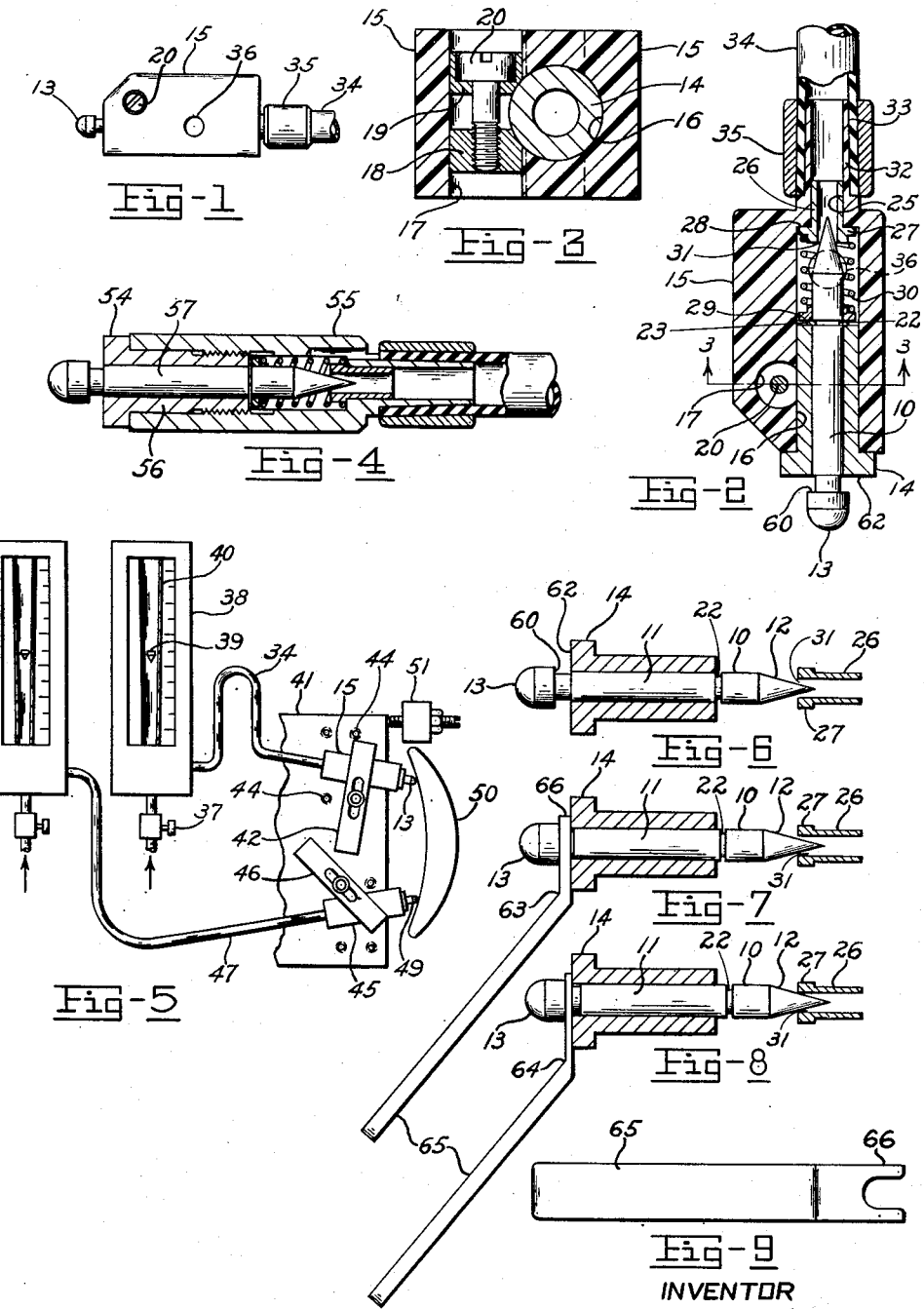
INVENTOR
W. F. Aller
BY Edward T. Noie
atty Patented Oct. 19, 1954

2,691,827

UNITED STATES PATENT OFFICE 2,691,827

ADJUSTABLE ORIFICE UNIT

Willis Fay Aller, Dayton, Ohio, assignor to The Sheffield Corporation, Dayton, Ohio, a corporation of Ohio Application August 17, 1950, Serial No. 179,992

18 Claims. (Cl. 33—172)

This invention relates to an adjustable orifice unit especially adapted for use in gauging apparatus.

One object of the invention resides in the provision of an orifice unit incorporating a body supporting an operating member one end of which is controllable by a workpiece or the like while the other end varies the size of an orifice opening to control a flow of fluid in accordance with a characteristic of the controlling part or workpiece. Such a unit is adapted to be mounted in various positions of use and connected through a suitable fluid connection to a fluid pressure source and a gauging device or the like which is responsive to fluid flow.

Another object is the provision of an orifice unit incorporating a movable operating member controlling the flow of fluid through an orifice in accordance with the position of the member, the operating member and the body in which it is movably carried having cooperating setting surfaces so that a locating tool or spacer can be applied during setup operations to arrange the operating member in a predetermined gauging position.

Another object of the invention is the provision of an orifice unit in which the operating member is spring pressed to a normal position and is adapted to be very conveniently set into predetermined precise positions with respect to the body by means of maximum and minimum locaters or spacers to adjust the size of the orifice in correspondence with definite permissible gauge indications.

Another object is the provision of a controllable orifice unit having provision for conveniently setting the orifice for maximum and minimum tolerance conditions.

Another object is the provision of an orifice unit for use in a fluid pressure system, providing for orifice control in accordance with a characteristic of a controlling part, the construction being such as to provide a unit of small compact construction and capable of being conveniently set up in advance of a controlling or gauging operation.

Another object resides in the method of setting up a gauging device in which the part gauged positions an orifice controlling member to control the indications of an air flow gauge and by which the device may be conveniently set up by using one master within the tolerance range.

Other objects and advantages of the invention will be apparent from the following description, the appended claims and the accompanying drawing, in which Fig. 1 is a side elevation of an orifice unit embodying the present invention;

Fig. 2 is a longitudinal section, on an enlarged scale, through the orifice unit;

Fig. 3 is a transverse section on the line 3—3 of Fig. 2;

Fig. 4 is a longitudinal section of an orifice unit of modified form;

Fig. 5 is a view showing how orifice units of the present invention may be employed for gauging the contour of a part;

Figs. 6, 7 and 8 show the relationship of the operating member and the orifice controlled thereby, Fig. 6 showing the relation of the parts in normal inactive position, Fig. 7 as set up for maximum acceptable size, and Fig. 8 as set up for minimum size; and Fig. 9 is a side view of one of the setting spacers.

Referring more particularly to the drawing in which the same reference numerals have been applied to like parts in the several views, Figs. 1, 2 and 3 show an adjustable or controllable orifice unit forming a compact unitary structure adapted to be connected in a fluid pressure system and controlled by a part such as a workpiece to be gauged for example. To gauge a characteristic such as the size or shape of a workpiece the unit may be clamped to a carrier which is movable with respect to the workpiece into a predetermined gauging position. The part will then control the size of the orifice to adjust a flow of fluid from a regulated pressure source of air or other fluid. Suitable gauging or indicating means in the fluid system responsive to fluid flow gives an indication of the characteristic gauged by comparison with indications obtained when a master, or maximum and minimum masters, are in place. By the term "pressure" is meant any pressure either positive or negative with respect to atmospheric pressure, and by the term "part" or workpiece is meant any unit controlling means effective on the operating member of the unit to govern the size of the fluid leakage orifice.

The operating member 10 is preferably formed as a metal stem 11 having a tapered end 12 and a work contacting portion such as a head 13 having a somewhat greater diameter than the slidably guided stem portion in a bushing 14 arranged in or forming a part of the body 15. The body has a straight bore 16 receiving the bushing and a transverse bore 17 which receives clamp elements 18 and 19 connected together by screw 20. When the screw 20 is tightened the clamp members 18 and 19 are drawn against the upper portion of the bushing 14 and secure the bushing firmly in position. When the screw 20 is loosened, the bushing together with the stem 10 can be conveniently removed for replacement or inspection. The stem has a shallow annular groove 22 receiving a split stop ring 23 which projects outwardly of the groove and abuts against the outer end of the bushing to prevent outward movement of the stem beyond the normal idle position of the stem. The various parts of the unit are made preferably of metal excepting the body which may be of hard composition or molded material.

The passage 16 in the body is in line with an extension passage 25 arranged concentrically at one end of the body 15 and of somewhat smaller diameter than the passage 16 and this passage 25 contains a sleeve 26 having a flange 27 that abuts against the shoulder 28 of the body. This sleeve preferably fits within the passage 25 with a press fit. Interposed between the inner end of the sleeve 26 and the split ring 23 on the stem is a pressure ring 29 and a spring 30, normally holding the stem 10 pressed outwardly with the ring 23 abutting against the bushing 14. In this position the tapered end 12 of the stem is partially received in the end of sleeve 26 which provides a fluid leakage orifice 31. As the stem moves towards the right, as viewed in Fig. 2, with respect to the body 15, the orifice is more and more restricted. Finally if the head 13 of the stem comes in contact with the outer end of the bushing the orifice is almost completely closed although even in this position of the stem it is preferred that the tapered end should be out of physical contact with the end of the sleeve 26. Air flowing from the orifice 31 discharges freely to atmosphere through a hole 36 in the body.

To assemble the various parts with the body 15 it is merely necessary to first press the sleeve in place from the large end of the passage in the body, then insert the spring 30, then pressure ring 29. The bushing 14 carrying the stem 10 and split ring 23 is then pushed in place and finally the screw 20 is tightened to draw clamp members 18 and 19 against the bushing.

The body is provided with an extension 32 preferably having an outwardly tapered tube receiving surface 33 on which the end of a flexible tube 34 can be pressed. A tapered ring 35 can be forced over the tube towards the body 15 and hold the end of the tube tightly. This tube 34 extends to a source of fluid pressure and a flow gauging device which is responsive to flow taking place through the orifice 31. Although any suitable type of flow gauging device may be used, as one example, as shown in Fig. 5, air under pressure can be supplied through an automatic pressure regulator 37 to an indicating gauge 38 having a float 39 operable in an upwardly extending and upwardly flaring transparent tube 40 the lower end of which is connected to the pressure regulator. The upper end of this tube leads to the flexible tube 34 which extends, as shown, to the body 15. The body 15 is held securely and adjustably on a suitable support or mounting plate 41 by means of a clamp 42 which is secured by means of a holddown bolt engaging in a selected one of a series of holes 44 in the plate 41. An orifice unit 45 may be held in place by clamp 46 and connected through tube 47 to a similar gauging device 48. The gauging head 49 of the unit 45 and the gauging head 13 of the body 15, as shown in Figure 5, may be used for checking the contour of a part or workpiece 50 such as an airfoil or turbine bucket. The orifice units may be brought into contact with the part 50 by moving the plate 41 against stop 51 that has a fixed relation with respect to the part 50 and if the indications produced on the gauges 38 and 48 fall within permissible upper and lower limits representing the permissible tolerance range, the operator knows that the part being checked satisfies the shape or size requirements. The gauging devices 38 and 48 of course are adjusted and the orifice units are properly set on the plate 41 in advance of the gauging operation and with a master part of the proper shape in place. It will be understood that as the gauge heads 13 and 49 contact the part they will be pressed inwardly to an extent determined by the size of the part, modifying the sizes of the orifices and thus controlling the flow through the gauging devices which will then be responsive to the positions attained by the gauging heads.

In the form of construction shown in Figs. 1 to 3, the body 15 is of rectangular cross section having a flat lower surface that may be clamped on a flat supporting plate. Fig. 4 shows a modified form of construction in which the body 55 is of circular cross section and the sleeve 56 that slidably supports the stem 57 is threaded in the body with its flange 54 abutting the end of the body so that the bushing and the body are firmly secured together. The other parts of the unit are similar to the construction illustrated in Figs. 1 to 3. Such a body of cylindrical form can be conveniently mounted in a round passage and clamped therein by any suitable holding or clamping means.

It will be noted that in both unit modifications, as shown in Figures 1–4, the outer positioning surfaces are of substantial area and the maximum transverse cross sections extend through substantial or major portions of the unit lengths. Preferably as shown in Figure 4 the mid-portion of the unit is as large as any other section along its length. These configurations adapt the unit for supporting on surfaces with the gauging axis parallel to the supporting surface (see, for example, Figure 5), mounting by insertion and clamping in holes, or by similar mounting arrangements. In the modification of Figure 4 the body 55 is of a circular cross section and forms a substantial continuation of the tube to which the unit is connected, thus adapting the units for as close grouping as is possible and for use in situations of limited space.

Referring again to the construction shown in Figs. 1 to 3, it will be noted that the gauging head 13 has a flat setting surface 60 normally spaced from a flat setting surface 62 on the end of the bushing 14, these two surfaces being adjacent one another and cooperating with one another in setting up the unit. For setup purposes the operator uses a pair of feelers or spacer tools 63 and 64. Each of these has a handle 65 and a flat spacer end 66 bifurcated to extend part way around the stem 10. The difference in the thicknesses of the setup spacers 63 and 64 is the same as the permissible or allowable size variation in the part to be gauged. For example, if the allowable tolerance of any particular gauging operation is one thousandth of an inch then the thickness of the spacer 63 may be four one-thousandths of an inch while the thickness of the spacers 64 may be three one-thousandths of an inch. The distance between surfaces 60 and 62 in Fig. 6 corresponding to the normal idle position of the parts may be six one-thousandths of an inch.

In setting up the unit for a particular gauging or controlling operation the operator may employ a master of known size corresponding to permissible oversize or undersize of the part to be checked. Assuming this master is undersize, the plate 41 is brought into gauging position and the body 15 is adjusted on the plate by loosening the bolt 43 and shifting the body, with the master 63 in place and with the master pressing against the gauging head 13 to close the head against the spacer. The clamp bolt 43 is then tightened and any necessary adjustments made on the gauge 38 so that its reading will be at a desired point on the scale, corresponding to the permissible undersize. The permissible oversize reading of the scale can then be ascertained by removing the spacer 63 and using an oversize master and without disturbing the position of the body 15 on the plate 41.

In accordance with the present invention however, two masters are not required and the master or reference part may have any known size in the allowable tolerance range. It is therefore preferred, in setting up the apparatus, to first coordinate the controllable orifice unit with the indicator and after that is accomplished to properly position the body 15 on its support carrier until the gauge indicator reading corresponds to the reference part size, which is known. In making this setup the operator inserts spacer 63 for example and holds the head 13 against the spacer merely by finger pressure. This corresponds to the position of the parts shown in Fig. 7 and gives a predetermined orifice opening. With this orifice opening he then adjusts the gauge 38 to make the float level correspond to a marker or line on the scale representing the permissible undersize limit. He then replaces the spacer 63 with oversize spacer 64 and by finger pressure he closes the head 13 on this spacer to give another predetermined orifice opening, corresponding to Fig. 8. Then he makes any further corrections to the gauge 38 so that the reading, with the spacer 64 in place, will correspond to another line or marker on the scale representing the permissible oversize limit. Since this further gauge correction may have disturbed the gauge setting for the master 63 the latter is replaced in back of the head 13 and the gauge 38 adjusted to return the reading to the undersize limit marker. Having properly coordinated the indicator gauge and the orifice unit the operator then adjusts the unit on its carrier or support, using a reference part of known size and with the carrier or support in gauging position, until the gauge reading corresponds to this known part size. The indicator itself tells him when the body 15 is properly positioned and when this is accomplished he merely tightens the clamp belt 43 to hold it securely. The one master or reference part he employs in this setup operation may correspond to nominal size, maximum oversize or minimum undersize or any value between oversize and undersize.

The adjustments of the gauge indicator to give a required length of indicator movement and a proper location of oversize and undersize limit readings may be accomplished mechanically or pneumatically depending on the character of the gauging device employed. With a flow measuring device using a tapered flow tube as set forth in the prior application of Willis Fay Aller S. N. 726,059, filed February 3, 1947, the gauge adjustments are made by controlling the pressure regulator, a bypass connection around the flow tube and a leakage or relief opening. These control the amplification factor and the position of the reading on the scale so that the gauge adjustments can be made to fit the particular scales and scale markings with which the gauge is equipped.

As will now be apparent, the orifice unit is small, compact, conveniently applicable to many and varying conditions and places of use and is adapted to be very conveniently set up or rechecked with only one master or reference part and without the necessity of having that reference part correspond in size to normal, oversize or undersize conditions.

While the forms of apparatus and the method herein described constitute preferred embodiments of the invention, it is to be understood that the invention is not limited thereto, and that changes may be made therein without departing from the scope of the invention which is defined in the appended claims.

What is claimed is:

1. A controllable orifice unit comprising a movable operating member adapted for positioning by a workpiece, a pressure fluid outlet orifice controlled thereby and a body supporting said member for movement relative to the body and the orifice, said body having an end portion through which the work positioned portion of the member extends and said body adapted for connection to a fluid pressure source to provide fluid flow through the orifice as determined by the operating member, said member and body having cooperating setting portions adapted to be arranged precisely at predetermined relative positions within the range of movement of the operating member by the temporary application of spacers during setup operations, and in combination therewith a pair of setting blades having thicknesses which differ precisely by a predetermined desired range contacting said setting portions in turn to arrange said setting portions in said predetermined relative positions during setup operations.

2. A controllable orifice unit comprising a movable operating member adapted for positioning by a workpiece, a pressure fluid outlet orifice controlled thereby and a body supporting said member for movement relative to the body and the orifice, said body having an outer positioning surface of substantial area extending substantially longitudinally thereof and said body adapted for connection to a fluid pressure source to provide fluid flow through the orifice as determined by the operating member, said member and body having cooperating parallel opposed setting surfaces normally spaced apart and adapted to be arranged precisely at different predetermined relative positions by spacer elements contacting with and cooperating between both the surfaces during setup operations.

3. A controllable orifice unit adapted for use in gauging apparatus comprising a movable operating member adapted for positioning by a workpiece, a pressure fluid outlet orifice controlled thereby and a body having an end opening through which said member extends, the body supporting said member for movement relative to the body and the orifice, said body having an outer positioning surface along its length of substantial area the cross-sectional size of which is greater than any other portion of the body length, said body being adapted for connection to a fluid pressure source to provide fluid flow through the orifice as determined by the operating member, means for yieldingly urging said member to a limiting position relative to the body, means determining another limiting position of said member, said member having a flange and said body having a cooperating setting end portion adapted to be arranged precisely at a predetermined positioning relative to said flange within the range of their relative movement.

4. A controllable orifice unit of the character described comprising a body having an outer locating surface of substantial area extending substantially longitudinally of the unit, a stem axially slidable in the body and having an orifice controlling end within the body and an outer work operated head, spring means yieldingly urging said head outwardly, said body having a passage provided with an opening the size of which is controlled by the orifice controlling end of said stem, said passage adapted for connection to a source of pressure fluid and said stem controlling the flow from said opening in accordance with its position as controlled by an external force, means preventing outward movement of the stem beyond a normal position and setting means including a surface on said head transverse of said stem and a surface on said body adjacent thereto, said surfaces being situated in relative opposed relationship and adapted for use with a spacer element for temporarily stopping the movement of the stem with respect to the body at a predetermined point which is inward of said normal position.

5. A controllable orifice unit as set forth in claim 5 in which the orifice controlling end of the operating member is tapered and partially enters the opening to form an adjustable leakage orifice.

6. A controllable orifice unit adapted for control by a workpiece in a guaging operation to vary the flow of fluid supplied under pressure to the unit, comprising a body having a longitudinally extending passage, a bushing in one end of said passage, a stem slidably guided in said bushing, said stem having an outer work operated head and an inner tapered end, a sleeve in the other end of said passage, said sleeve providing a central flow path terminating in an opening adjacent the tapered end of said stem and controlled thereby to vary flow through said sleeve in accordance with the position of said stem, said path adapted for connection to a source of fluid under pressure, means engaging said stem to urge said stem outwardly, stop means for limiting the outward movement of the stem beyond a normal position, said head and bushing having adjacent facing locating surfaces so that setting feelers can be inserted therebetween and temporarily limit inward movement of the head for setup purposes.

7. A controllable orifice unit as set forth in claim 6 the passage through said body being of reduced diameter at one end thereof to receive said sleeve and said sleeve having a shoulder cooperating with the body to position the sleeve therein, the construction being such that the sleeve and the bushing can both be assembled from the same end of the passage.

8. A controllable orifice unit adapted for use in a gauging apparatus in which a workpiece determines the amount of fluid flow from a pressure source comprising a body the cross sectional peripheral form of which is uniform throughout an extended axial length, an operating member slidably carried by said body and having an orifice controlling tapered end within the body and an outer work operated head, spring means yieldingly urging said head outwardly, said body having a passage provided with an opening the size of which is controlled by the tapered end of said member, said passage adapted for connection to a source of fluid pressure and said member controlling the flow of fluid through said passage in accordance with the position to which said member is moved by the workpiece, means preventing outward movement of the head beyond a normal position and setting means operative for cooperation with the body and the head for stopping the inward movement of the head with respect to the body at two predetermined points inward of said normal position and corresponding to maximum and minimum allowable tolerance limits of the workpiece.

9. A controllable orifice unit adapted for control by a workpiece in a gauging operation to vary the flow of fluid supplied under pressure to the unit, comprising a longitudinally extended body member, said body member including a body portion having a reduced end extension adapted for connection to an air gauge and a source of fluid pressure by telescopic engagement with a flexible tube, the maximum transverse cross-section of said body portion extending uniformly through a substantial portion of the body portion length whereby the unit can be mounted on a supporting surface with its axis parallel thereto, the maximum transverse cross-section having a maximum dimension comparable to the outside diameter of the tube, and the body member forming a substantial continuation of the flexible tube to which the unit is connected, whereby a plurality of such units can be situated on a supporting surface with their axes closely adjacent for the measurement of very closely spaced points on a workpiece surface, an orifice outlet in said body member communicating with the tube connection, a movable operating member carried by said body member having an exposed work contacting surface and an inner surface situated in controlling relationship with said orifice outlet, and resilient means carried by said body portion biasing said operating member outwardly.

10. A controllable orifice unit adapted for control by a workpiece in a gauging operation to vary the flow of fluid supplied under pressure to the unit, comprising a longitudinally extended body member, said body member including a body portion having a reduced end extension adapted for connection through a flexible tube to an air gauge and a source of fluid pressure, said body portion having a uniform transverse cross-section throughout a major portion of its length which defines the maximum cross-sectional form of the entire orifice unit, said body portion being adapted for clamping with respect to supporting surfaces in gauging positions as desired, said body member being of limited maximum transverse dimension to form a substantial continuation of the flexible tube, an orifice outlet in said body portion communicating with the tube connection, an extended plunger mounted in said body portion for movement along the axis thereof and projecting from said body portion at the outer end thereof, cooperating stop means in said body portion and on said plunger limiting the projection of said plunger from said body portion, an inner section on said plunger cooperating in control relationship with said orifice outlet and a work contacting portion at the outer end of said plunger.

11. A controllable orifice unit adapted for control by a workpiece in a gauging operation to vary the flow of fluid supplied under pressure to the unit comprising a longitudinally extended body member adapted for connection at one end thereof to a flexible tube, a passage along the axis of said body member formed by two coaxial cylindrical portions of different diameters the smaller of said cylindrical portions being at said one end of said body member, a radial shoulder being formed in said body where the cylindrical hole portions join, a sleeve, said sleeve providing a flow path from said tube connection, a sleeve projection of the same diameter as the smaller of said cylindrical portions for insertion thereinto, a radially projecting shoulder portion on said sleeve for abutment with said radial shoulder, a bushing insert having an external diameter corresponding to that of the larger cylindrical portion and a projecting shoulder for cooperation with the other end of said body member, means for securing said bushing in said larger cylindrical portion, said bushing having a longitudinal hole therethrough, a plunger slidably mounted in said bushing having a projecting work contacting portion at its outer end and with its other end in controlling relationship with said sleeve, an annular groove in the surface of said plunger adjacent its inner end, a snap ring element seated in said groove, a spring cooperating between said snap ring element and the body member radial shoulder urging said plunger out of said body member, said snap ring serving to limit the outward projection thereof.

12. A controllable orifice unit comprising a body portion having an external locating surface thereon for adjustable clamping as desired, said body having an orifice outlet therein and adapted for connection to a fluid pressure source, a movable plunger slidably carried by said body and projecting therefrom at one end of the body, said plunger having a work contacting portion at the outer end thereof and an orifice controlling surface at its inner end, means in said body yieldably urging said plunger outward, cooperating stop means on said body and said plunger limiting the outward projection of said plunger, a first surface at said one end of said body at a definite disposition relative to said orifice outlet, a second surface on the projecting end of said movable plunger at a definite disposition relative to said orifice controlling surface, said first and second surfaces opposing one another in facing relationship whereby different orifice openings can be obtained by closing said surfaces against interposed spacer elements.

13. A controllable orifice unit comprising a body portion having an external locating surface thereon for adjustable clamping as desired, the mid-section of the body portion length being as large as any other section along its length, said body having an orifice outlet therein and adapted for connection to a fluid pressure source, a movable plunger slidably carried by said body and projecting therefrom at one end of the body, said plunger having a work contacting portion at the outer end thereof and a tapered orifice controlling surface at its inner end, means in said body yieldably urging said plunger outward, cooperating stop means on said body and said plunger limiting the outward projection of said plunger, a first surface at said one end of said body at a definite disposition relative to said orifice outlet, a second surface on the projecting end of said movable plunger at a definite disposition relative to said orifice controlling surface, said first and second surfaces opposing one another in facing relationship whereby different orifice openings can be obtained by closing said surfaces against interposed spacer elements, said first and second surfaces also serving as stop means to limit the inward movement of the plunger, one of said stop means being so arranged on the body and plunger with respect to the orifice outlet and orifice controlling surface as to prevent contact of the orifice controlling surface with the orifice outlet.

14. The method of setting up a gauging device in which a gauge head having a movable work contactor is adjustably secured on a carrier and controls an indicator which is responsive to the position of the work contactor as controlled by the workpiece, such method comprising presetting the work contactor into a predetermined position with respect to the gauge head merely by finger pressure or the like on the work contactor, setting the indicator to show one tolerance limit, presetting the work contactor into another predetermined position with respect to the gauge head merely by finger pressure or the like on the work contactor so that the variance in the work contactor position from the first presetting operation corresponds to the total tolerance range of the workpiece to be gauged, setting the indicator to show the other tolerance limit and arranging the carrier and a reference piece in gauging position and adjusting the gauge head position on the carrier relative to the reference piece so that the indicator shows the proper reading corresponding to the particular dimension of the reference piece.

15. The method of setting up a gauging device in which a gauge head having a movable work contactor is adjustably secured on a carrier and controls an indicator which is responsive to the position of the work contactor as controlled by the workpiece, such method comprising presetting the work contactor into two predetermined positions so related with respect to one another as to have a known relationship to the tolerance range of the work to be gauged prior to positioning the gauge head in gauging position, adjusting the indicator at each of these positions to provide a predetermined indication and then moving the work contactor with respect to the gauge head by means of a reference piece in gauging position and adjusting the position of the gauge head on the carrier so that the indication produced corresponds to the known characteristic of the reference master.

16. The method of setting up a gauging device in which a gauge head having a movable work contactor is adjustably secured on a carrier and controls an indicator which is responsive to the position of the work contactor as controlled by a workpiece and in which the work contactor has a normal projected position, such method comprising moving the work contactor from its normal projected position against a stop merely by pressure applied to the work contactor, setting the indicator to show one range limit, moving the work contactor so it is adjusted from its first stop position a distance precisely equal to a desired range and against a second stop, setting the indicator to show the other range limit, and then so adjusting the gauge head on a carrier with the work contactor in contact with a reference piece until the indicator shows the proper reading corresponding to the particular dimension of the reference piece, and securing the gauge head to the carrier in that position.

17. The method of setting up a gauging device in which an air gauge having amplification and indicator position setting means is operatively connected for measurement of the rate of flow through a gauge head having a fluid leakage orifice and an orifice controlling work contactor, such method comprising presetting the work contactor into a first predetermined position with respect to the gauge head, setting the indicator by adjusting its setting means to show one range limit, presetting the work contactor into a second predetermined position with respect to the gauge head so that the displacement of the work contactor position from the first presetting position precisely corresponds to a desired range, setting the indicator by adjusting its setting means to show the other range limit, then so adjusting the gauge head on a carrier with the work contactor in contact with a reference piece until the indicator shows the proper reading corresponding to the particular dimension of the reference piece, and securing the gauge head to the carrier in that position.

18. The method of setting up a gauging device in which an air gauge having amplification and indicator position setting means is operatively connected for measurement of the rate of flow through a gauge head having a fluid leakage orifice and an orifice controlling work contactor, the gauge head work contactor having opposed surfaces thereon allowing the application of spacer elements of different sizes thereagainst, which sizes differ precisely by a desired range, such method comprising closing the surfaces against a first spacer merely by pressure on the work contactor, setting the indicator to show the other limit, closing the surfaces against the second feeler merely by pressure on the work contactor, setting the indicator to show the other limit, then so adjusting the gauge head on a carrier with the work contactor in contact with a reference piece until the indicator shows the proper reading corresponding to the particular dimension of the reference piece, and securing the gauge head to the carrier in that position.

References Cited in the file of this patent

UNITED STATES PATENTS

| Number | Name | Date |
|---|---|---|
| 1,661,701 | Michler | Mar. 6, 1928 |
| 2,218,871 | Broden | Oct. 22, 1940 |
| 2,249,611 | Johnson | July 15, 1941 |
| 2,490,376 | Rupley | Dec. 6, 1949 |
| 2,504,212 | Mennesson | Apr. 18, 1950 |
| 2,527,173 | Boat | Oct. 24, 1950 |